United States Patent [19]
Andresen

[11] Patent Number: 4,574,286
[45] Date of Patent: Mar. 4, 1986

[54] CONTROLLER OF MAGNETICALLY SATURATED TYPE HAVING PROGRAMMED OUTPUT CHARACTERISTIC

[76] Inventor: Herman J. Andresen, 726 Carriage Hill, Glenview, Ill. 60025

[21] Appl. No.: 470,165

[22] Filed: Feb. 28, 1983

[51] Int. Cl.⁴ .................... G08C 19/06; H01H 19/00; G05G 9/00
[52] U.S. Cl. ........................... 340/870.31; 340/365 L; 200/6 A; 74/471 R
[58] Field of Search ............... 340/365 L, 709, 870.31, 340/870.35, 870.36; 74/471 R, 491, 523; 323/330, 347; 200/6 A

[56] References Cited

U.S. PATENT DOCUMENTS

| | | | |
|---|---|---|---|
| 2,852,732 | 9/1958 | Weiss | 323/94 |
| 3,128,625 | 4/1964 | Heineman | 73/209 |
| 3,267,404 | 3/1964 | Hieronymus | 338/32 |
| 3,305,770 | 2/1967 | Hulls | 338/32 |
| 3,395,341 | 7/1968 | Malaquin | 324/70 |
| 3,462,673 | 8/1969 | Hieronymus | 323/69 |
| 3,465,238 | 9/1969 | Marlow | 340/870.31 |
| 3,474,332 | 10/1969 | Brown | 324/34 |
| 3,691,502 | 9/1972 | Kataoka | 338/32 |
| 3,698,531 | 10/1972 | Bernin | 197/98 |
| 3,718,872 | 6/1973 | Takeuchi | 332/51 R |
| 3,753,202 | 8/1973 | Kataoka et al. | 338/32 H |
| 3,818,326 | 6/1974 | Masuda et al. | 324/34 PS |
| 3,958,202 | 5/1976 | Sidor | 336/110 |
| 3,958,203 | 5/1976 | Bernin | 336/110 |
| 3,988,710 | 10/1976 | Sidor et al. | 338/32 R |
| 4,088,977 | 5/1978 | Bowman, Jr. et al. | 338/32 |
| 4,121,185 | 10/1978 | Genz | 336/110 |
| 4,137,512 | 1/1979 | Sidor | 335/206 |
| 4,229,993 | 10/1980 | Andresen | 74/538 |
| 4,332,177 | 6/1982 | Andresen | 74/491 |
| 4,507,601 | 3/1985 | Andresen | 74/491 |

OTHER PUBLICATIONS

Licon Product Bulletin PS-1000, Series 33 Position Sensors and Signal Conditioner (Illinois Tool Works, 1979) (4 pp.).
Monsun-Tison Brochure (8 pp.).

*Primary Examiner*—John W. Caldwell, Sr.
*Assistant Examiner*—Michael F. Heim
*Attorney, Agent, or Firm*—Leydig, Voit & Mayer, Ltd.

[57] ABSTRACT

A position sensor for producing a variable electrical output signal in response to manipulation of a quadrant lever or the like. A pair of tubes of equal length made of magnetically saturable material are secured to a frame in parallel proximity to a sheet-like permanent magnet which is mounted on a carrier. The magnet has a pair of active angled edges and the tubes are oriented to transversely intersect the respective angled edges, being so spaced from one another that the tubes are magnetically saturated over complementary fractions of their length. Each tube is engaged by at least one turn of wire and a detector circuit is provided having its input connected to the turns of wire for producing an electrical output signal in accordance with the differential magnetic saturation of the tubes. Each tube is angled generally transversely with respect to the direction of relative movement. In addition the presented edges of the magnet are angled at such acute angle with respect to the direction of relative movement that, upon such movement the tubes are respectively engaged by successive portions of the angled edges, so that one of the tubes is progressively more saturated in its longitudinal dimension while the remaining tube is progressively less saturated, with the degree of saturation of the tubes in the longitudinal dimension remaining substantially complementary over the range of relative movement. The acute angle is sufficiently shallow so that the range of relative movement substantially exceeds the length dimension of the tubes. The magnet has a reference position with respect to the tubes in which each tube is saturated over such portion of its longitudinal dimension as will result in a zero output signal at the reference position.

26 Claims, 51 Drawing Figures

CONTROLLER OF MAGNETICALLY SATURATED TYPE HAVING PROGRAMMED OUTPUT CHARACTERISTIC

In the control of numerous devices, from machine tools to earth moving equipment, manual controls are used in which a manually positioned lever or similar element results in an electrical signal which is utilized for positioning a valve or other controlled element. A simple example of such a "position transducer" is a potentiometer coupled to a quadrant lever. However potentiometers during the course of usage may become worn or corroded resulting in poor contact and erratic action. As a result, attention has been given to position transducers capable of producing an electrical output signal but which are free of electrical contacts and hence longer wearing and more reliable. Examples of "contactless" potentiometers employing the saturation principle are to be found in prior U.S. Pat. Nos. 3,958,202, 3,958,203, 3,988,710, 4,088,977, and 4,121,185. The devices disclosed in these patents all employ a tube, or pair of tubes, of magnetically saturable material relatively moveable into and out of the vicinity of a magnet so as to produce variable saturation, the tube or tubes being engaged by drive and sense windings which are connected to a detector circuit which converts the saturation into an electrical output signal.

Such devices, in general, have had two drawbacks. In the first place they have been limited to production of a linear or substantially linear output characteristic as a function of input motion. Secondarily the devices have been limited to a range of relative motion corresponding to the length dimension of the tubes being used. This has limited the uses to which such transducers may be put.

It is, accordingly, an object of the present invention to provide a position transducer of the magnetically saturable type which is not limited to a linear output characteristic but in which a wide range of linear or non-linear output characteristics may be achieved. It is a related object to provide a position transducer of the magnetically saturable type in which any desired output characteristic may be obtained as required for specialized applications, even multi-stepped and mathematically sophisticated characteristics, which may be either symmetrical or unsymmetrical in the forward and reverse directions without any limitation whatsoever.

It is a related object to provide a contactless position transducer of the saturable type in which a complex output characteristic may be achieved quickly and inexpensively by tailoring the profile of a sheet-like permanent magnet used as an element in the device. Thus it is an object to provide a position transducer of the saturable type which is well adapted to the use of a magnet formed of permanently magnetizable particles in a matrix of soft plastic formed into a thin sheet and which may be quickly and easily trimmed to shape and conveniently installed in the control.

It is still another object to provide a position transducer of the magnetically saturable type which may be manually varied and set with a high degree of precision and in which the available control movement greatly exceeds that of prior devices. More specifically it is an object to provide a position transducer employing saturable tubes in which the mechanical adjusting movement substantially exceeds, up to several fold, the length dimension of the tubes.

It is yet another object of the invention to provide the position transducer of the magnetically saturable type having the advantages above set forth but which may be constructed in a number of distinctly different ways depending upon intended usage. Specifically the active edges of the magnet may lie in a plane for response to reciprocating movement or may lie in a helix or spiral for response to rotary or rocking movement.

It is an object of the invention in one of its detailed aspects to provide a transducer of the magnetically saturable type which employs a composite magnet, as contrasted with unitary magnets used heretofore, the composite magnet being the form of separate longitudinal strips of permanently magnetized plastic material magnetized in a special way to improve the projection of magnetic flux from the presented surface of the magnet, thereby to improve efficiency of saturation.

Other objects and advantages of the invention will become apparent upon reading the attached detailed description and upon reference of the drawings in which.

While the invention has been described in connection with certain preferred embodiments, it will be understood that there is no intention to limit the invention to the particular embodiments which have been illustrated, but it is intended, on the contrary, to cover the various alternative and equivalent forms of the invention included within the spirit and scope of the appended claims.

Turning now to the drawings there is shown a quadrant lever type of controller 10 having a frame in the form of a hollow shell or housing 11 with a gabled top surface 12, end walls 13, 14 and a front wall 15 defining a central space 16. This space is enclosed by a cover plate 17 secured by small machine screws 18.

Mounted in the wall 15 of the housing 11 is a hollow cylindrical bushing 20. Journalled in the bushing is a hollow shaft 21 having an axis 22.

Secured to the shaft is a composite quadrant lever 30 consisting of an inner tubular element 31 and an outer tubular element 32 which are telescoped together, the inner tube being secured at 33 to the shaft by brazing or the like, so that the inner tube carries the outer one in the course of its back and forth movement.

At its upper end the inner tube 31 mounts a palm rest 35 in the form of a ball of plastic or the like which is screwed onto a stud 36 which is anchored in the inner tube by means of a cross pin 37. At the upper end of the outer tube 32 there is a finger grip 38 in the form of an annular enlargement and which has a normal position such that the degree of spread between the palm rest and finger grip is within a range which enables the fingers of the operator to engage the finger grip while the palm of the hand rests upon the palm rest.

Figure 3:
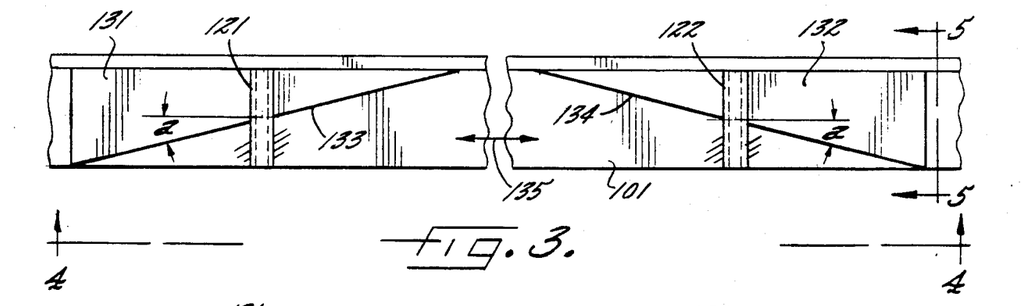
FIG. 3 is a developed view of the sheet-like magnet as viewed along line 3—3 in FIG. 2.
Figure 4:
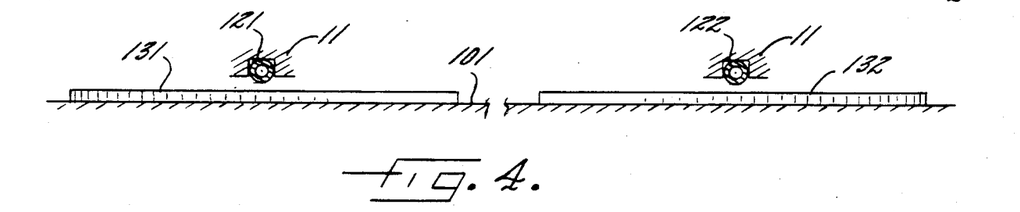
FIG. 4 is a developed elevational view looking along line 4—4 in FIG. 3.
Figure 5:
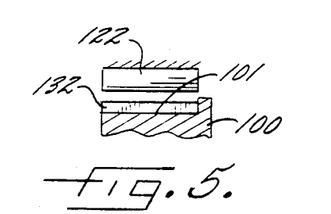
FIG. 5 is an end-view looking along line 5—5 in FIG. 3.

Slidably mounted within the inner tube 31 is a sliding plug 40 which is pressed downwardly by means of a compression type coil spring 41. Screwed into the side of the plug is a laterally extending pin 42 having a projecting tip 43 which serves, as will be seen, as a cam follower. The pin is received in, and extends through, an opening 44 formed in the outer tube. A longitudinal clearance slot 45 formed in the inner tube permits longitudinal movement of the pin. The slot 45 has a bottom end 46 which serves as a limit stop. The spring 41, pressing down upon the sliding plug 40, bottoms the pin 42 and thereby determines the condition of maximum spread between the palm rest 35 and finger grip 38. When the hand of the operator, indicated at H in FIG. 3, is placed with the palm on the ball 35, the fingers in a natural grasping position engage and curl upon the finger grip 38 so that, with squeezing motion, the finger grip 38 can be elevated progressively to an upraised limit position 38'. Such squeezing motion causes the outer tube to pull upwardly upon the pin 42 which raises the sliding plug 40 against the restoring force of the compression spring 41.

Figures 1, 1A, 2, 2A:
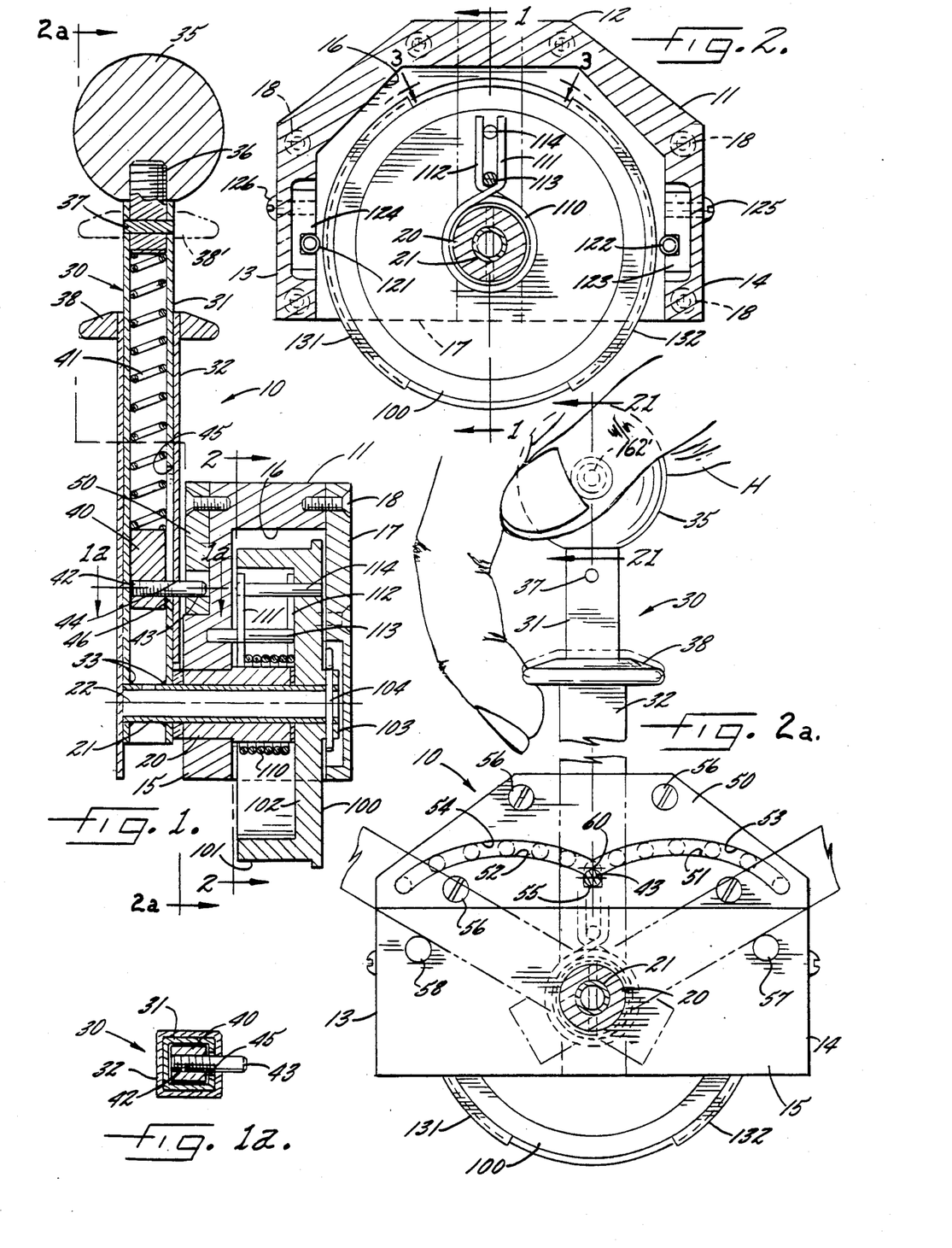
FIG. 1 is a vertical section taken through a manual controller embodying the present invention looking along line 1—1 in FIG. 2.
FIG. 1a shows a cross section taken through the quadrant lever along line 1a—1a in FIG. 1.
FIG. 2 is a transaxial section taken along line 2—2 in FIG. 1.
FIG. 2a is a similar section looking along the line 2a—2a of FIG. 1 and showing the face of the cam plate.

In carrying out the invention a stationary cam plate 50 (FIG. 2a) is provided presenting a cam track consisting of a first portion 51 and a second portion 52 having respectively opposed walls 53, 54 and a central or reference position 55. The cam follower 43 extends between the walls and perpendicularly to the plane of swinging movement of the lever. The cam plate is secured in position by screws 56. Stops 57, 58 at the ends of the cam track limit the stroke.

As covered in detail in a co-pending application the cam track is so contoured that upon movement of the lever from its reference position the cam follower 43 is yieldingly obstructed by the cam track so that progressive free movement of the lever must be accompanied by progressive squeezing movement of the hand of the operator, with the result that the squeezing movement controls the progress of rocking movement. With the cam follower occupying the central position 60, the lever is initially blocked. However, upon applying squeezing movement between the fingers and the palm of the hand, overcoming the force of the coil spring 41, the cam follower 43 is progressively raised with the squeezing movement "giving permission" on a constant and progressive basis for the angular swinging movement of the lever. The invention disclosed herein can, however, be utilized with simplified forms of quadrant levers or similar actuators.

In carrying out the present invention, the controller includes a drum coupled to the shaft with a magnetically saturable tube mounted on the frame and spaced from and parallel to the drum axis, with an extensive permanent magnet mounted on the surface of the drum so shaped that as the quadrant lever is rocked there is a progressive change in the portion of the tube which is magnetically saturated by the magnet. Thus, referring particularly to FIGS. 1 and 2, there is provided, at the end of the shaft 21, and mounted within the housing 11, a drum 100 which may, for example, be made of aluminum and which is of hollow cup shape, having a cylindrical surface 101 and an end wall 102 defining a hub 103. Penetrating the shaft 21 and hub 103 is a cross pin 104 which couples the drum rigidly to the lever.

For the purpose of maintaining the lever and drum normally in a reference position, a centering spring 110 is provided surrounding the bushing 20 and which has straight radially extending ends 111, 112. The ends of the spring embrace, between them, a first pin 113 connected to the frame and a second pin 114 which is anchored in the drum, the pins extending parallel to one another in the axial direction. The effect of the spring is to bias the pins into radial alignment with one another thereby biasing the quadrant lever and drum into a centered reference relationship.

For the purpose of producing an electrical control signal which depends upon the direction and amount of angular movement of the lever, a pair of magnetically saturable tubes 121, 122 (FIG. 2) are provided. These are secured in capsules 123, 124, respectively, which are fastened to the inner end walls 13, 14 of the frame or housing by means of screws 125, 126, the tubes being arranged parallel to one another and to the drum axis and spaced a short distance from the surface of the drum. For cooperating with the tubes an extensive magnet having sections 131, 132 (FIGS. 2 and 3) is cemented to the surface of the drum, the the sections having respective angled edges 133, 134, respectively which extend at an angle a along the length dimension of the magnet. As shown, the sections are preferably so spaced that each spans one half of the length of its adjacent tube when the lever is in a central, reference position. Thus, the rocking of the drum, which serves as a carrier, by the lever away from reference position 135 results in progressive differential saturation of the tubes in a sense which depends upon the direction of the quadrant lever movement.

The magnetic material used for the magnet sections 131, 132 is a staple of commerce consisting of a flexible sheet of plastic loaded with particles of barium ferrite or equivalent. The material comes in various thicknesses and may be cut to a desired shape following which it may be permanently magnetized. The material is available as a staple of commerce from a number of different sources including 3M Company, Industrial Electrical Products Division, 3M Center, St. Paul, Minn. 55101 or from Bunting Magnetics Co., 500 South Spencer Avenue, Newton, Kans. 67114. The ferrite tubes per se, also a staple of commerce, may be obtained from Indiana General, Valparaiso, Ind. 46383, Stackpole Company, St. Mary's, Pa. 15857, or Ceramic Magnetics Inc., Fairfield, N.J. 07006.

Figure 7A:
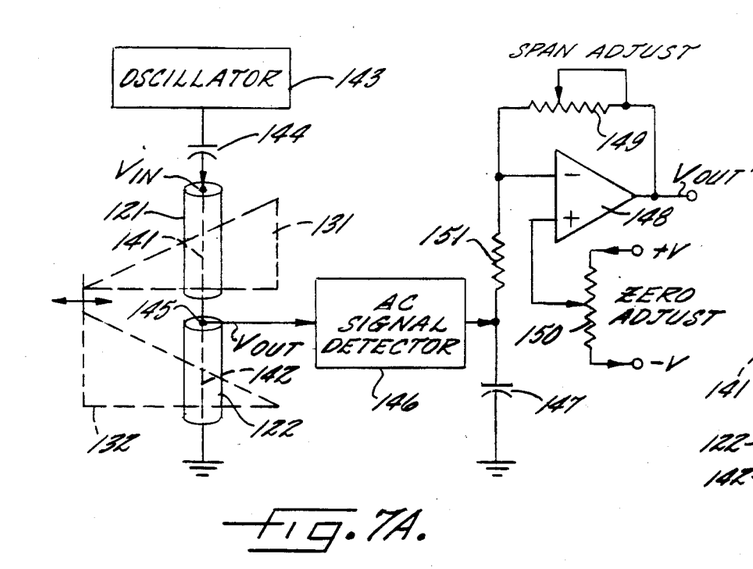
FIGS. 7A and 7B are schematic diagrams of control circuits for converting differential saturation to an output voltage.

For the purpose of producing an output signal which varies in magnitude and direction as the drum is rocked in either direction from its reference position, a sensing circuit 140 of the type set forth in FIG. 7A may be used. The saturable tubes 121, 122 are threaded with one or more "pickup" turns 141, 142 which sense the degree of saturation of the tubes 121, 122. An oscillator 143 generates an excitation signal of about one kilohertz which is coupled to the pickup turns 141, 142 by a capacitor 144. As shown, the excitation $V_{in}$ is applied across the pickup turns 141, 142 connected in series with respect to ground. An output signal $V_{out}$ appears at the midpoint or tap 145 connecting the pickup turns 141, 142. Since the pickup turns 141, 142 constitute the two impedances of a voltage divider, the output and excitation signals are related to the fractional inductance $\alpha$ (of the lower tube 122) and the non-saturated self-inductance $L$ according to:

$$\frac{V_{out}}{V_{in}} = \frac{\alpha L}{\alpha L + (1-\alpha)L} = \alpha$$

The fractional inductance $\alpha$ is one-half for the middle positon of the magnets 131, 132 as shown. The self-inductance of the lower tube 122 is $\alpha L$ and the self-inductance of the upper tube 121 is $(1-\alpha)L$. Hence, the amplitude of the output signal $V_{out}$ is a linear function of the fractional inductance $\alpha$ and thus the difference in saturation of the tubes.

In order to generate a DC electrical control signal $V_{out}'$ from the AC output signal $V_{out}$, an AC signal detector 146 generates a DC signal proportional to AC amplitude. A directional diode, for example, may be used, although more precise amplitude or peak detectors are available as integrated circuits. A signal conditioning chip, Part No. 80330057 manufactured by Interdesign Corp., is especially useful since it includes an oscillator as well as a peak detector. A demodulation or low-pass filter capacitor 147 shunts the AC signal detector 146 output to ground.

In order to independently adjust the span or range of DC signal $V_{out'}$ for a given position deviation of the magnets 131, 132 and the zero point of the DC signal $V_{out'}$, a buffer amplifer 148 is provided having independent gain and offset controls 149, 150, respectively. The gain of the operational amplifer 148 is set by the resistance ratio of the adjustable resistor 149 and a series input resistor 151. The potentiometer 150 selects the zero or bias point of the amplifer 148 as a point between the positive $+V$ and negative $-V$ supply voltages.

During an initial calibration step, the span adjust control 149 is set midrange and the magnets 131, 132 are placed in the desired center reference position. Then the zero adjust control 150 is adjusted to obtain a zero output voltage $V_{out}'$ with respect to ground. Finally, the magnets 131, 132 are moved to a full-scale position, and the span adjust control 149 is adjusted for the desired full-scale voltage $V_{out}'$ with respect to ground.

Figure 6:
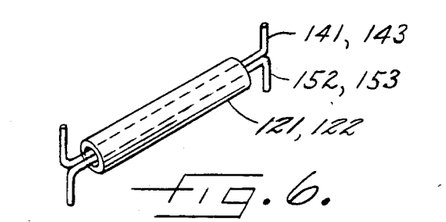
FIG. 6 is a perspective view of a saturable tube with its drive and sense windings.
Figure 7B:
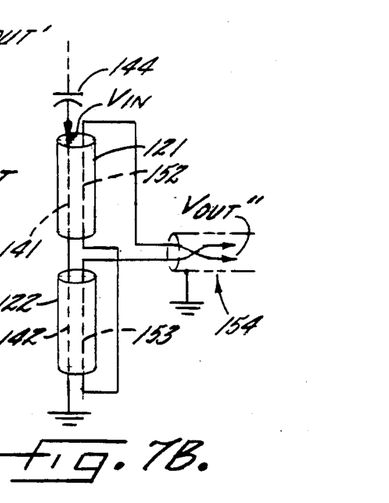

In FIG. 7A the saturable tubes are wired as inductors with single drive and pickup coils 121, 122 to sense differential self-inductance. Alternatively, as shown in FIGS. 6 and 7B, secondary or sense coils 152, 153 respectively, may also be wound to sense the differential mutual inductance of the tubes. In this manner, the saturable tubes 121, 122 and coils 141, 142, 152, 153 comprise a differential transformer which generates a balanced output signal $V_{out}''$. The amplitude of the balanced output $V_{out}''$ is proportional to the distance of the magnets 131, 132 from the center reference position, while the phase or polarity of the output signal $V_{out}''$ is indicative of the particular direction from the center reference position. The differential connection of FIG. 7B has noise and interference rejection advantages over the single-ended connection of FIG. 7A, but it requires a balanced product detector (e.g., diode ring or switching demodulator such as IC Part No. 4016) for the AC signal detector 146 in order to compare the phase of the AC output signal $V_{out}''$ to the phase of the oscillator 143 output. But the balanced circuit of FIG. 7B is conveniently used as a remote position sensor since a shielded twisted pair signal cable 154 provides excellent isolation from external electromagnetic interference.

In accordance with the present invention the presented edges of the magnet are so acutely angled with respect to the direction of relative movement that upon such movement the tubes are each progressively engaged by successive portions of the respective angled edges and, depending upon the direction of movement, one of the tubes is progressively more saturated in its longitudinal dimension while the remaining tube is progressively less saturated in its longitudinal dimension to produce a corresponding change in the output signal, the acute angle being sufficiently shallow so that the active range of relative movement between the carrier and the frame substantially exceeds the length dimension of the tubes.

Figure 8:
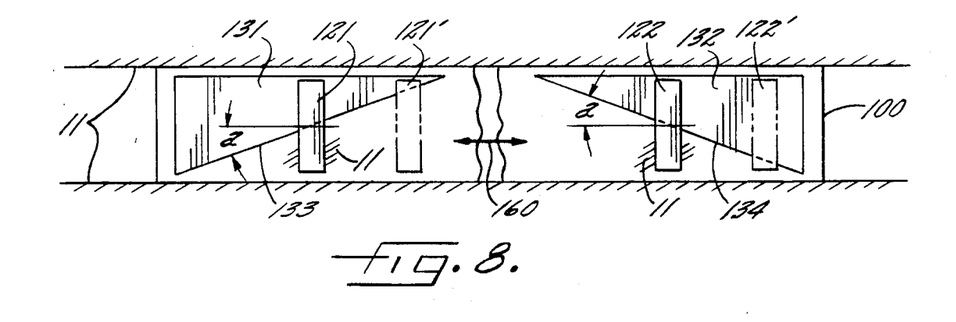
FIG. 8 is a generalized top, or profile, view showing a magnet having two triangular portions arranged end-to-end.
Figure 12:
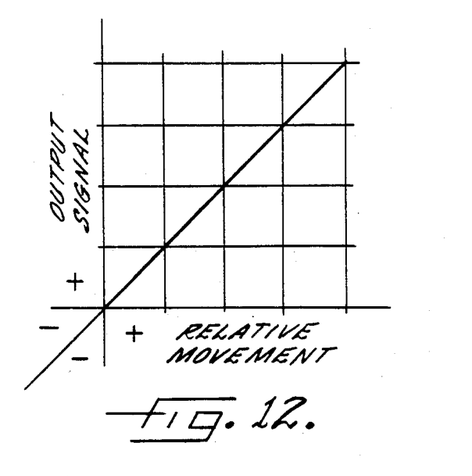
FIG. 12 shows a typical output signal characteristic typical of the embodiments illustrated in FIGS. 8–11.

Thus, referring to FIG. 8, in which it will be understood that the tubes 121, 122 are secured to the frame 11 and the magnet sections 131, 132 are secured to the carrier 100, relative movement takes place along line 160, such relative movement bearing a shallow angle a to the angled edges 133, 134 of the magnet sections. It will be apparent that when relative movement takes place along line 160, the tubes 121, 122 are shifted in relative position to positions 121', 122', with the tube 121 becoming less saturated and the tube 122 becoming more saturated, giving rise to a signal at the output of the detector circuit (FIG. 7) which is of predetermined polarity and which varies linearly, as shown in FIG. 12. Relative movement in the opposite direction from the reference position produces a signal of reverse polarity, also as set forth in FIG. 12.

In the preferred form of the invention the degree of saturation of the tubes in the length dimension remains substantially complementary over the active range of relative movement.

Figure 9:
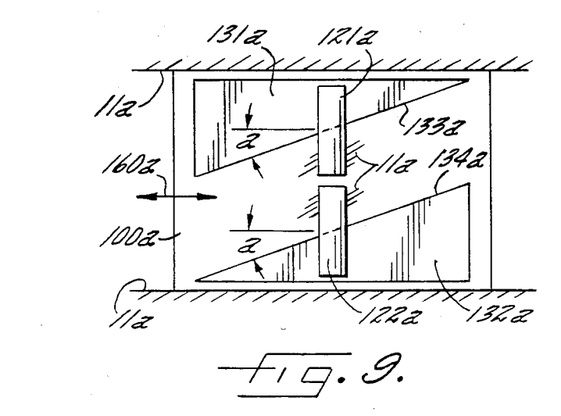
FIG. 9 shows use of a magnet having two portions arranged side-by-side.

In the embodiment illustrated in FIG. 9, in which similar elements are represented by similar reference numerals with the addition of subscript a, the saturable tubes 121a, 122a are arranged end-to-end and the two sections 131a, 132a of the magnet are arranged one above the other on the carrier 100a. Relative movement along line 160a brings about the same characteristic output signal as diagrammed in FIG. 12.

Figure 10:
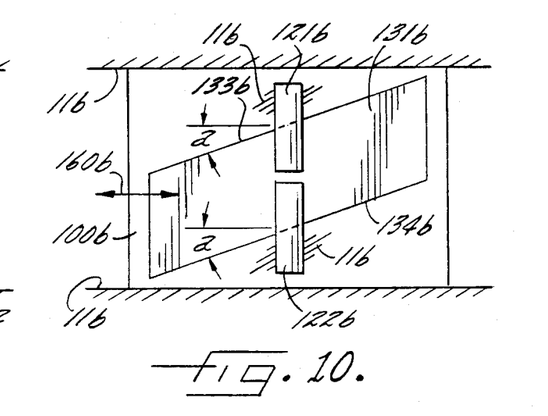
FIG. 10 shows an arrangement similar to FIG. 9 but employing a unitary magnet.

In the embodiment shown in FIG. 10, in which the elements are denoted by subscript b, the two sections of the magnet have been integrated into a single, or unitary, section of parallelogram shape, indicated at 131b, having angled edges 133b, 134b each of which bears a shallow angle a with respect to the direction of relative movement 160b.

Figure 11:
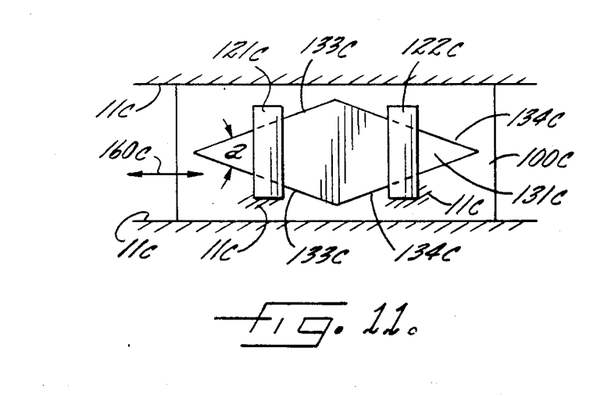
FIG. 11 shows a construction similar to FIG. 10 but employing a differently shaped unitary magnet.

In FIG. 11 there is shown another embodiment employing a single-section, or unitary, magnet 131c having angled edges 133c, 134c, each of which bears an angle a with respect to the direction of relative movement 160c. The electrical output characteristics of the embodiments shown in FIGS. 10 and 11 correspond typically to that set forth in FIG. 12.

In each of the embodiments described thus far the active angled edges of the magnet bear substantially equal angles with respect to the direction of relative movement. Moreover, in each of the embodiments the tubes 121, 122 are angled symmetrically with respect to the active edges of the magnet and are arranged generally transversely with respect to the direction of relative movement. Moreover, in such embodiments the tubes are arranged parallel to one another with their axes perpendicular to the direction of relative movement. In each of the embodiments the magnet, which is either in sections or unitary, may lie in a horizontal plane or may lie in a cylinder, in which latter case each of the active angled edges of the magnet occupies a helical locus.

In accordance with one of the more detailed features of the present invention, each of the active edges of the magnet may be provided with an abrupt step to cause a relatively abrupt change in output signal as a function of displacement as the saturable tubes traverse the step. Thus, referring to FIG. 13 in which the elements are denoted by the subscript d, the magnetic section 131d has a step 161d formed in its angled edge 133d while the section 132d has a step 162d formed in its angled edge 134d. In the embodiment shown in FIG. 14, in which similar elements are indicated by subscript e, the steps 161e, 162e are formed in the respective edges 133e, 134e. Similarly, in the embodiment illustrated in FIG. 15, steps 161f, 162f are formed in the edges 133f, 134f.

Figure 13:
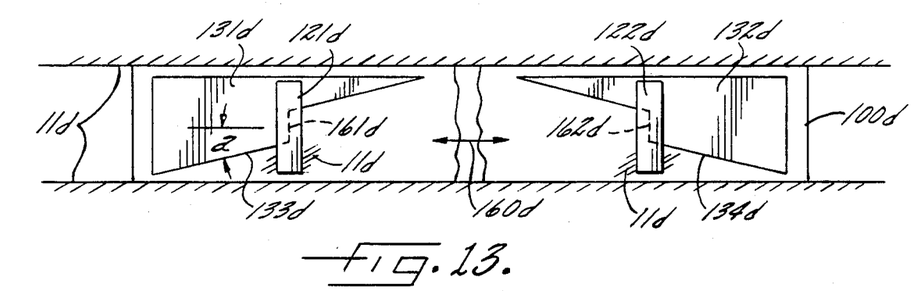
FIGS. 13, 14 and 15 show magnet profiles corresponding to those set forth in FIGS. 8, 9 and 10, but with the edges of the magnets stepped at the center to provide a rapidly rising characteristic at the origin.
Figure 14:
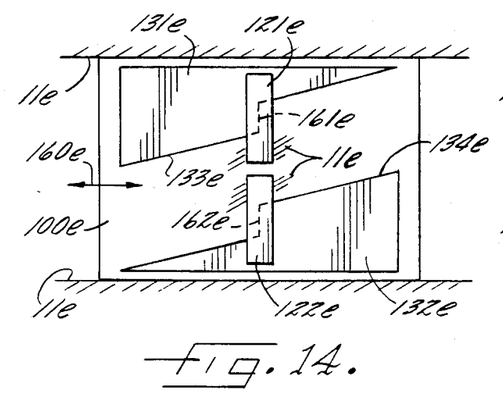
Figure 15:
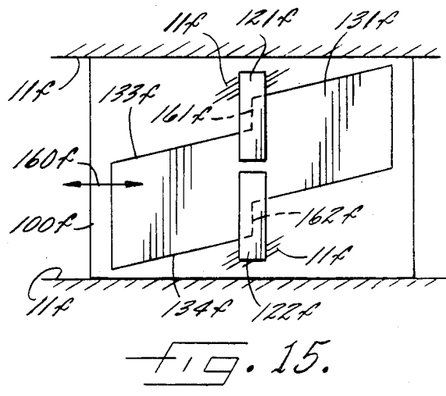
Figure 16:
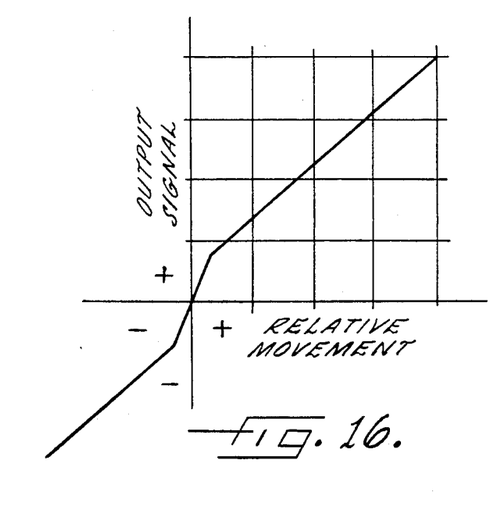
FIG. 16 is an output characteristic typical of the constructions illustrated in FIGS. 13, 14 and 15.

The output characteristics of the embodiments of FIGS. 13–15 are as set forth in FIG. 16, where it will be noted the step has produced an abrupt rise in output signal upon relative shifting movement from the central or reference condition.

Figure 17:
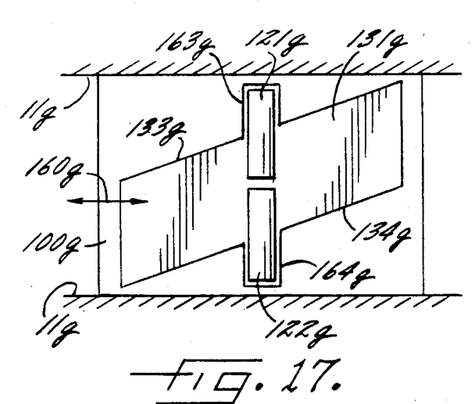
FIG. 17 shows a magnet having a profile similar to FIGS. 10 and 15 but with full saturation at the central null position.

In each of the embodiments described thus far the saturable tubes are saturated over approximately one half of their length when in the relative central or reference position. However, the invention is not limited to this and, if desired, and as shown in FIG. 17, the angled edges 133g, 134g may be extended as shown at 163g, 164g causing the saturable tubes 121g, 122g to be saturated in the reference condition. The resulting output characteristic is substantially of the same shape as illustrated in FIG. 16. Complete saturation of the tubes 121g, 122g in reference position has the advantage over the use of steps 161f, 162f (FIG. 15) in providing a better initial balance of the control circuit in the central, or null, position, thereby making the null more sharply defined.

Figure 18:
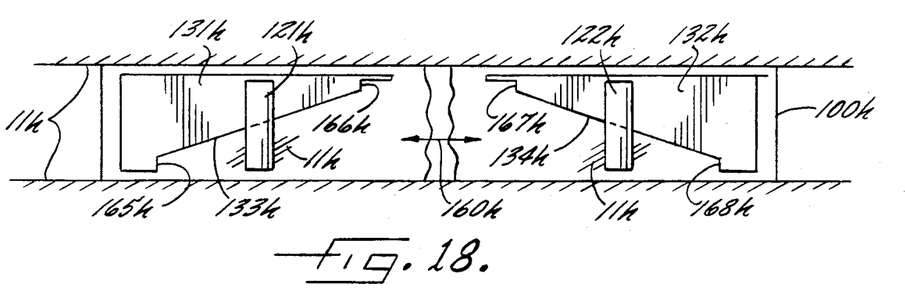
FIGS. 18 and 19 show magnet profiles similar to FIGS. 9 and 10 but with steps at the limits of movement in order to provide a rapidly rising output characteristic at the limit positions.
Figure 19:
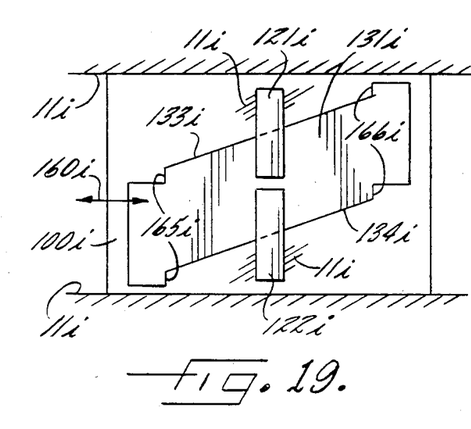
Figure 20:
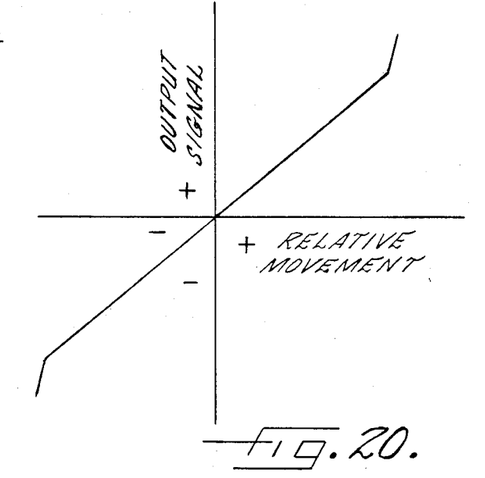
FIG. 20 shows an output characteristic typical of the profiles shown in FIGS. 18 and 19.
Figure 21:
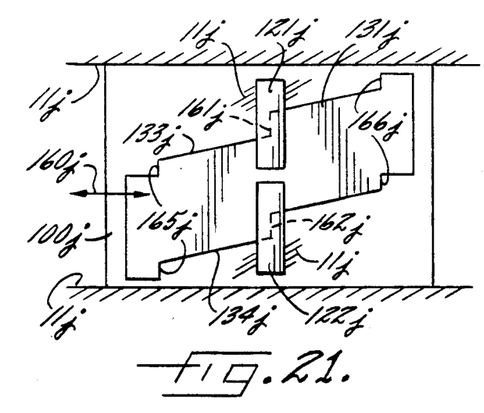
FIG. 21 shows a combination of the profiles in FIGS. 15 and 19, providing a rapidly rising characteristic both at the null position and at the extreme end positions.
Figure 22:
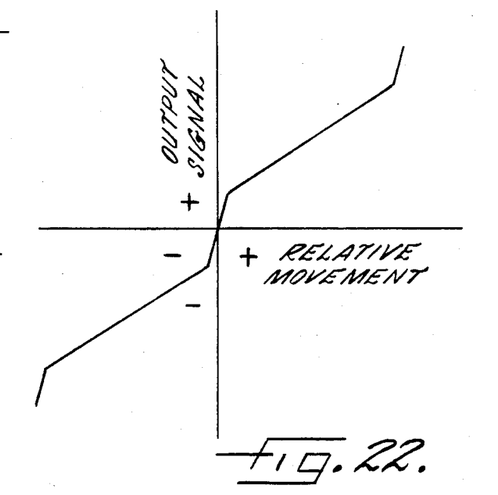
FIG. 22 is an output characteristic corresponding to the structure shown in FIG. 21.

Still further in accordance with the invention, steps may be provided in the angled active edges of the magnet at the end regions of the relative movement. Thus, referring to FIG. 18, the first section of the magnet 131$h$ may be provided with steps 165$h$, 166$h$ while the second section 132$h$ has steps 167$h$, 168$h$. Similar steps may be provided at the end regions of a unitary magnet as set forth in FIG. 19. Here it will be noted that the active edges 133$i$, 134$i$ have steps 165$i$, 166$i$ at the respectively opposite ends. The effect in both of the embodiments illustrated in FIGS. 18 and 19 is to produce increased abruptness of output at the respective ends of the output characteristic as illustrated in FIG. 20. Indeed, steps may be utilized both at the reference position and at the extreme positions of relative movement as shown in the embodiment of FIG. 21, where similar elements are denoted by subscript j. Here it will be noted that the active edges have central steps 161$j$, 162$j$ as well as end steps 165$j$ 166$j$. The effect of this as illustrated in FIG. 22, is to provide more abrupt rise in the output characteristic both in the region of the central or reference position and at the extremes of relative movement.

Figures 23, 23A, 24, 24A, 25, 26:
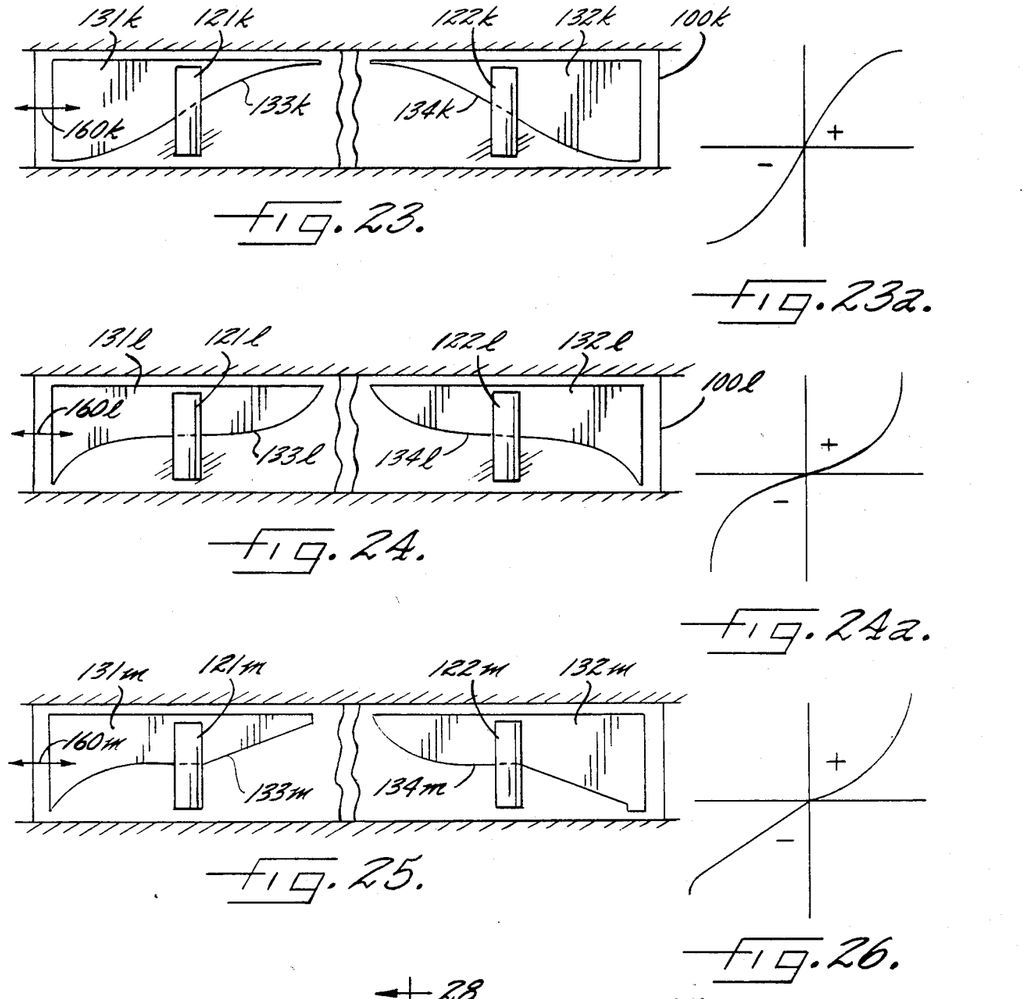
FIG. 23 shows profiles similar to those of FIG. 8 but with the active edges of the magnet curved in an S-configuration to achieve steep response at the null position.
FIG. 23a is an output characteristic corresponding to the structure of FIG. 23.
FIG. 24 shows a magnetic profile analogous to FIG. 23 but with a differently shaped S-configuration to provide maximum response approaching the end positions of the range.
FIG. 24a is an output characteristic typical of the structure of FIG. 24.
FIG. 25 shows a profile of a magnet having two sections, and which is thus similar to FIG. 8, but in which the two sections are non-symmetrical with respect to one another.
FIG. 26 shows a non-symmetrical output characteristic typical of the profile shown in FIG. 25.

In the embodiments described above the angled edges have been either straight or stepped. It will be understood that the invention also includes a making of the angled edges of curved configuration as set forth in FIG. 23 where the magnet section 131$k$ has a curved active edge 133$k$ while the companion section 132$k$ has a curved edge 134$k$, the two edges being mirror images of one another. This produces a typical characteristic as set forth in FIG. 23$a$ in which maximum change of output signal, with relative motion, occurs smoothly in the region of the origin.

Or, if desired, the angled edges may be differently curved so that the maximum rate of change of signal with respect to displacement occurs in the region of the limits of movement. In this embodiment, shown in FIG. 24, the magnet sections 131$l$, 132$l$, have angled edges 133$l$, 134$l$ which are curved in a direction opposite to that of the preceding embodiment, giving rise to the typical characteristics shown in FIG. 24$a$.

In each of the embodiments described thus far the active angled edges are symmetrically related, for example, a mirror image of one another. Such symmetry is not, however, an essential in the practice of the present invention and, if desired, the active edges may be formed in non-symmetrical fashion as illustrated in FIG. 25 in which similar elements are indicated by the subscript m. Thus, it will be noted that the edges 133$m$, 134$m$ of the magnet sections 131$m$, 132$m$, respectively, are of unlike shape producing the type of output characteristic which is illustrated in FIG. 26 where it will be noted that the output characteristic differs in the forward and reverse directions of relative movement.

Figure 27:
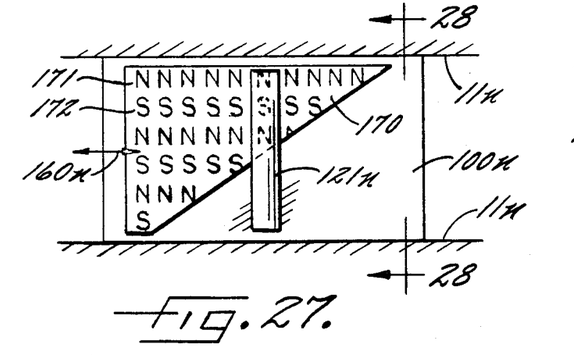
FIG. 27, shows a magnet and cooperating saturable tube in which the magnet is magnetized in adjacent parallel strips of unlike polarity.
Figure 28:
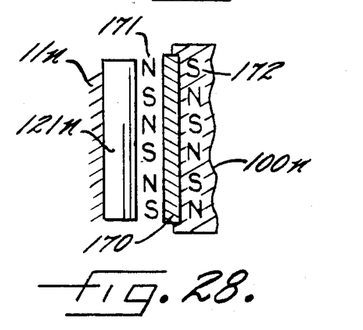
FIG. 28 is an end view looking along line 28—28 in FIG. 27.

In the various embodiments of the invention described above, it has been assumed that the magnet, consisting of a layer of permanently magnetic material and substantially constant thickness and which may be either unitary or in two sections, is polarized uniformly in the thickness mode, that is, with one face being a north pole and the other face a south pole. In accordance with one of the more detailed features of the present invention each magnet, or section thereof, may be nonuniformly polarized with north and south poles occupying adjacent positions on the same face as shown in FIGS. 27 and 28. Here a magnet section 170 will be seen to have rows of north and south poles, indicated at 171, 172, respectively, alternating on the same face and all cooperating with a saturable tube 121$n$. The alternating polarity is found to increase the projection of the magnetic flux from the surface of the magnet. This makes it possible to use thicker tubes or to space the tubes from the surface by a greater distance while still achieving full saturation. In utilizing the control circuit of FIG. 7 with the structure of FIG. 27, a "dummy" saturable companion tube may be used and maintained in the fully saturated or fully unsaturated state.

Figure 29:
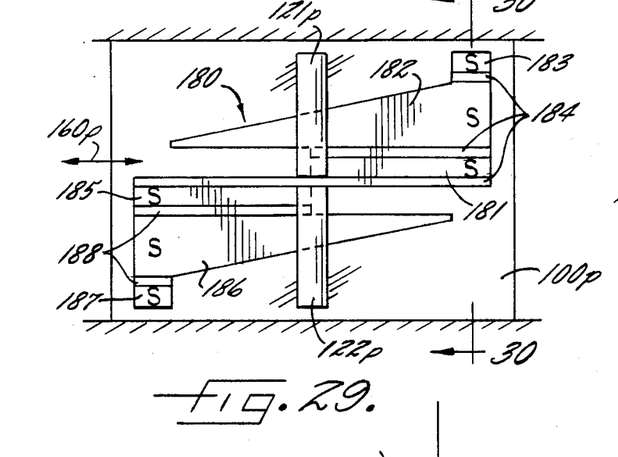
FIG. 29 is a top, or profile view, of a composite magnet made up of separated strips.
Figure 30:
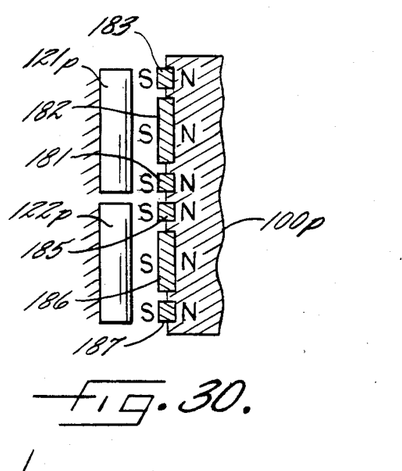
FIG. 30 is an end view looking along line 30—30 in FIG. 29 showing uniform polarization.
Figure 31:
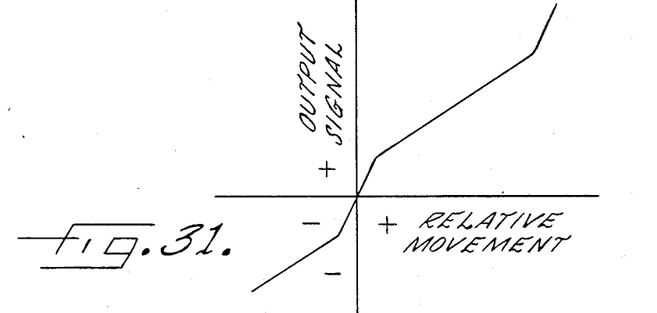
FIG. 31 shows an output characteristic typical of the structure shown in FIGS. 29 and 30.

In accordance with one of the aspects of the present invention the magnet, or its separate sections, need not be monolithic but may be made up of strips which are physically separated from one another. Thus, the magnet indicated at 180 in FIG. 29, and which cooperates with saturable tubes 121$p$, 122$p$, may have a first section consisting of strips 181, 182 and 183 separated by nonmagnetic spacers 184 while the second section may consist of strips 185, 186, 187 separated by nonmagnetic spacers 188. Such strips may be polarized as set forth in FIG. 30 to produce an output characteristic of the form illustrated in FIG. 31.

Figures 32, 33, 34:
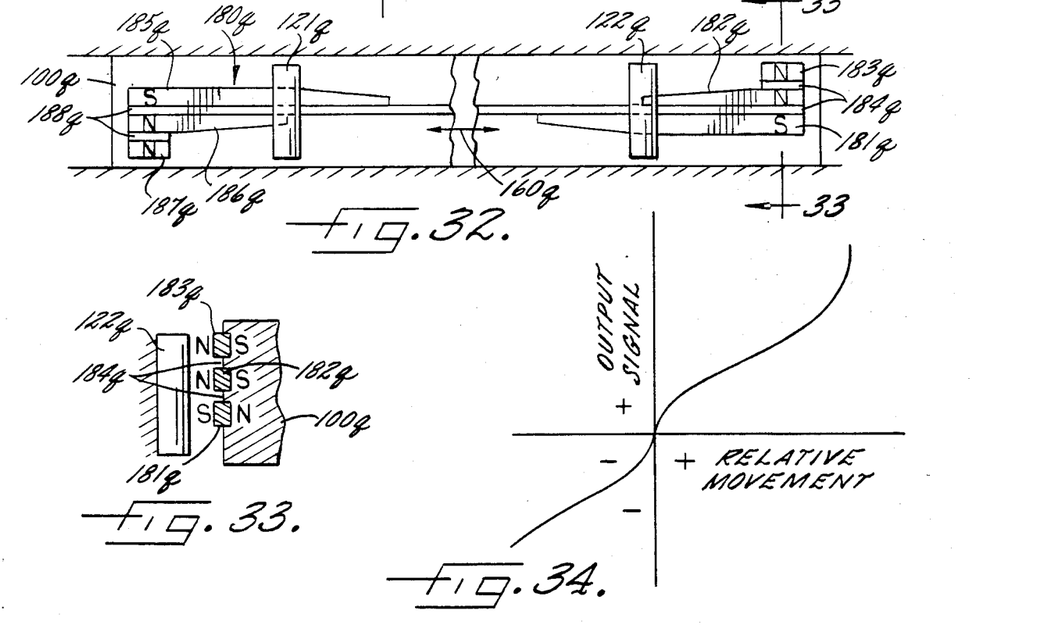
FIG. 32 is a top, or profile view, of a further embodiment of composite magnet.
FIG. 33 is an end view looking along line 33—33 in FIG. 32 with partially reversed polarization.
FIG. 34 shows an output characteristic typical of the structure shown in FIGS. 32 and 33.

A somewhat similar construction is illustrated in FIGS. 32, 33 where similar reference numerals have been employed with the addition of subscript q and with a portion of the strips being alternately polarized as set forth in FIG. 33, to produce an output characteristic as illustrated in FIG. 34. It will be noted that in both FIGS. 29, 30 and FIGS. 32, 33 at least a portion of the strips are of tapering width. However, this is not essential to the practice of the invention and the strips may, if desired, be of constant width but of differing length.

The embodiments of the invention described above have utilized linear movement in a planar or cylindrical locus. However, in accordance with one of the aspects of the present invention the relative movement may be of an arcuate or pendulous nature as illustrated in the embodiment of FIGS. 35 and 36 wherein corresponding elements have been denoted by subscript r. In this embodiment the saturable tubes 121$r$, 122$r$ will be considered as fastened to the frame while the magnet 131$r$ is pendulously secured to a carrier 100$r$ having a pivot axis 190. In this embodiment the magnet 131$r$ has angled active edges 133$r$, 134$r$ which cooperate with the respective tubes and which are spirally oriented about the center 190 of the arcuate path. In operation, it will be apparent that when the carrier 100$r$ is in its central or reference position each of the saturable tubes 121$r$, 122$r$ is saturated to 50% of its length. Relative movement in one direction, with the tubes occupying one set of the dot-dash relative positions, causes the first tube 121$r$ to be fully saturated and the adjacent tube 122$r$ completely unsaturated, while the reverse is true at the opposite end of the range. This produces an output characteristic of the linear type as illustrated in FIG. 37, but it will be understood that the active edges 133$r$, 134$r$ may be stepped or otherwise deformed to produce more specialized operating characteristics set forth in any of the above characteristic curves.

Figures 35, 36, 37, 38, 39, 40:
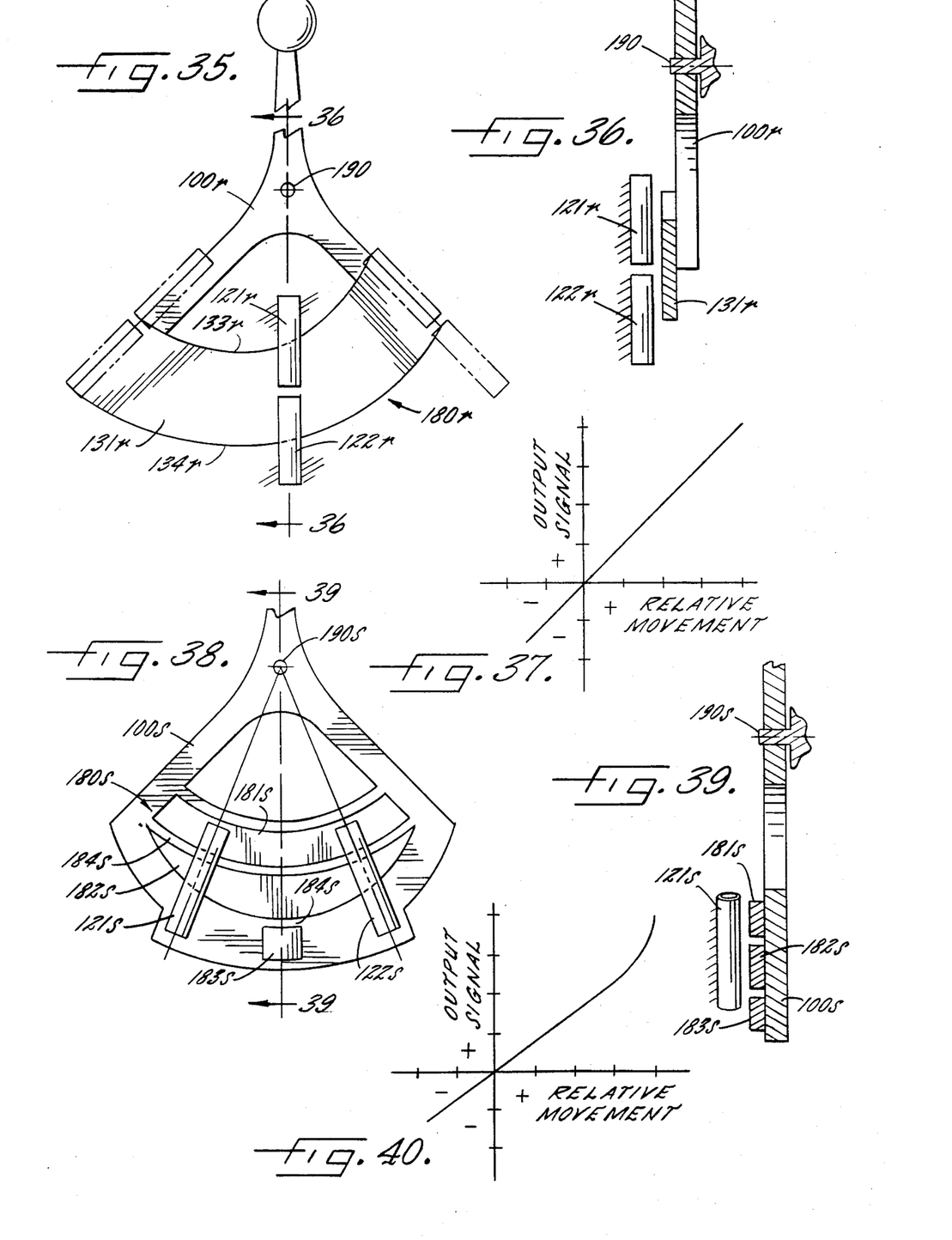
FIG. 35 shows the invention applied to a carrier of pendulous configuration in which the active edges of the magnet are spiralled about the axis of rocking movement.
FIG. 36 is a vertical section looking along line 36—36 in FIG. 35.
FIG. 37 shows an output characteristic typical of the structure of FIGS. 35 and 36.
FIG. 38 shows another pendulous structure employing saturable tubes laterally spaced side-by-side instead of end-to-end and with a magnet of composite construction.
FIG. 39 is a radial section taken along line 39—39 in FIG. 38.
FIG. 40 is an output characteristic corresponding to the structure of FIGS. 38 and 39.

Moreover, if desired, the magnet 131$r$ illustrated in FIGS. 35, 36 may be made up of composite strips as illustrated in FIGS. 38 and 39. In this figure corresponding elements have been indicated by corresponding reference numerals with the addition of subscript s. Thus, the magnet indicated generally at 180$s$ is formed, analogously to the structure shown in FIG. 29, with three portions 181$s$, 182$s$ and 183$s$ separated by spaces 184$s$ and cooperating with tubes 121$s$, 122$s$, the tubes being relatively fixed to the frame while the magnet is mounted upon a pendulous carrier 100$s$ rockable about an axis 190s. The result is to produce an output characteristic as set forth in FIG. 40.

Figure 41:
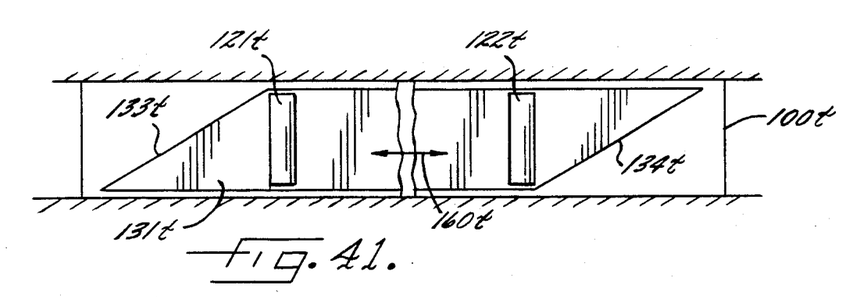
FIG. 41 shows structures similar to that disclosed in FIGS. 8-11 inclusive but in which the saturation of only one of the tubes is varied, the state of saturation of the other tube remaining constant.

In the various embodiments illustrated and discussed above the saturable tubes are saturated throughout approximately one half of their length in the reference position, with one tube being more saturated and the other tube being less saturated upon movement in a given direction from the reference. In accordance with one of the aspects of the invention both tubes may be initially saturated and, upon departure from reference, one tube may be decreasingly saturated while the other remains fully saturated thereby to produce a differential condition of saturation resulting in an output signal. This may be accomplished by an arrangement of magnet and tubes illustrated in FIG. 41 in which corresponding elements are represented by corresponding reference numerals with addition of subscript t. Here the magnet indicated at 131t mounted upon the carrier 100t presents a first angled edge 133t to a first tube 121t and presents a second angled edge 134t to a second saturable tube 122t. Movement of the carrier 100 to the right, the tubes being fixed to the frame, progressively desaturates the first tube 121t while keeping the second tube in the saturated condition and vice versa. This principle may also be used with respect to tubes which are in axial alignment with one another as set forth in the embodiment shown in FIG. 42 in which corresponding reference numerals have been used to denote corresponding elements with addition of subscript u. Stepped projections 163u, 164u may be utilized as previously described in connection with FIG. 17 to improve the definition of the null position.

Maintaining one of the tubes saturated while varying the state of saturation of the other tube may be also achieved in the pendulous, or spiral, embodiment previously discussed in connection with FIG. 38. Thus, referring to FIG. 43, a carrier, indicated at 100w, carries a compositie magnet 180w consisting of three strips 181w–183w. Swinging movement from the illustrated null position causes one of the tubes 121w, 122w to be less saturated while keeping the companion tube at the fully saturated level, and with an output signal of one polarity or the other being produced as the result of a differential saturation.

Figures 42, 43, 44, 45, 46:
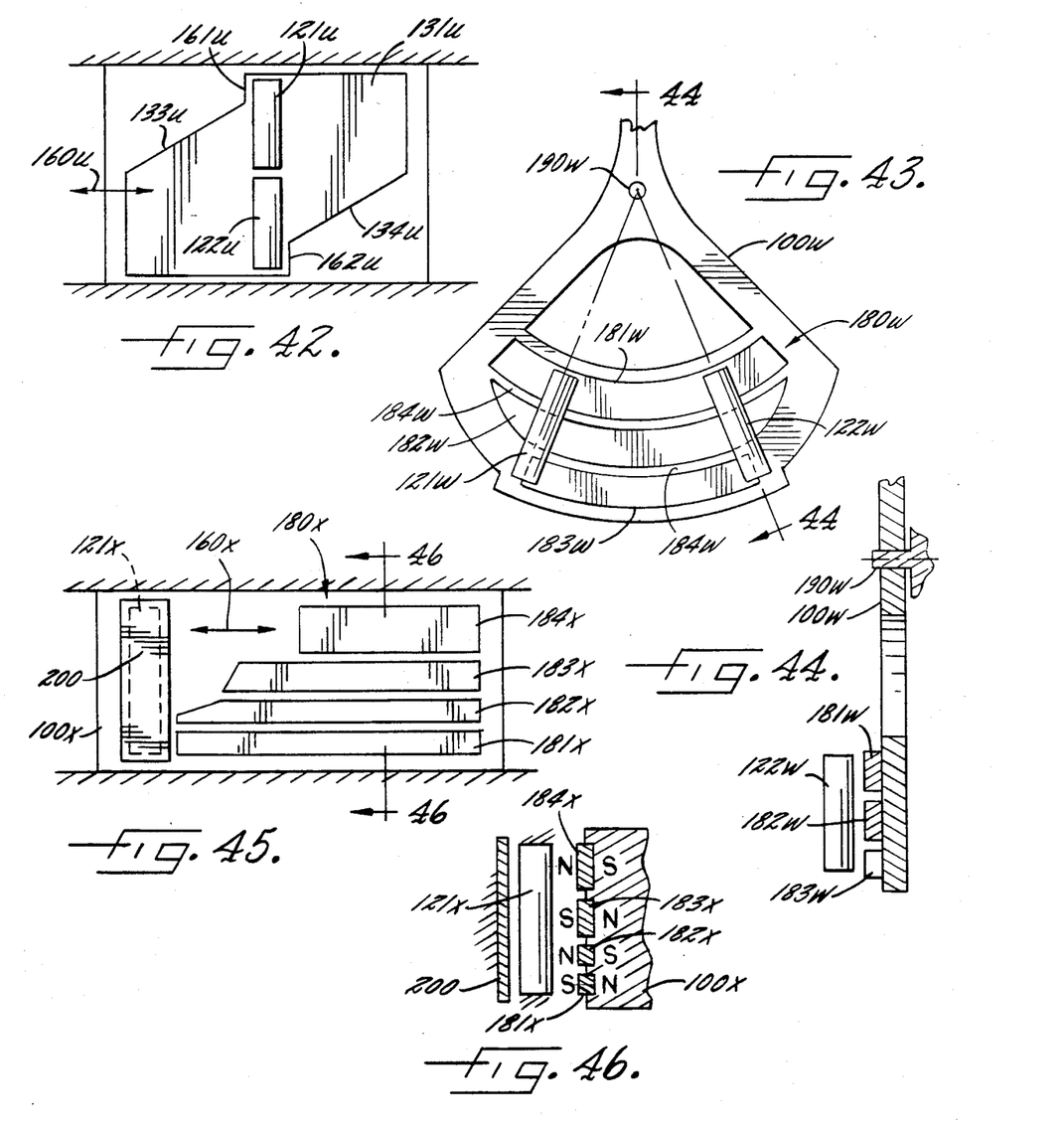
FIG. 42 shows a construction analogous to FIG. 41 but with the tubes arranged end-to-end.
FIG. 43 shows a pendulous version in which the state of saturation of one of the tubes remains constant in either direction of movement.
FIG. 44 is a vertical section looking along line 44—44 in FIG. 43.
FIG. 45 shows another version in which the saturation of only a single tube is varied, the magnet in this case being of composite non-linear construction and with an intensifier strip being fixed adjacent the backside of the tube.
FIG. 46 is an end view looking along line 46—46 in FIG. 45.

In certain of the above embodiments, it has been stated that greater "projection" of the magnetic flux from the surface of the magnet may be achieved by utilizing a composite magnet formed in strips and with alternating polarity in the strips. Thus, there is shown in FIG. 45 a carrier 100x mounting magnetic strips 181x–184x which cooperate with a saturable tube 121x. In accordance with one of the more detailed aspects of the invention, the projection of the flux may be further enhanced by providing, on the back side of the tube 121x, and fixed with respect to it, an "intensifier" strip of a magnetic material having high permeability and low reluctance. Such intensifier strip is indicated at 200 in FIG. 45. It will be understood that such intensifier strips may be provided in any of the embodiments discussed earlier, that is, on the back side of each of the saturable tubes for producing saturation which is more linearly related to displacement while, at the same time, increasing the permissible spacing between the tube and the surface of the magnet or, alternatively, enabling the use of magnets having a lower flux density. Just as in the case of the embodiment disclosed in FIG. 27, the structure shown in FIG. 45 may be utilized with the control circuit of FIG. 7 by using a dummy companion tube which may either be fully saturated or completely unsaturated.

In the above discussion of the invention, it has been assumed that the magnet is mounted upon a movable "carrier" while the saturable tubes are stationarily mounted upon the frame. However, it will be apparent to one skilled in the art that it is the relative movement which is important and, if desired, the tubes may be mounted upon a movable carrier while the cooperating magnet is fixed with respect to the frame. This being the case, it will be understood that the terms "carrier" and "frame" as used herein are fully interchangeable with one another.

In certain of the embodiments described above, the active angled edges of the magnet bear a constant angle, at each point along the edge, to the direction of relative movement. In other ones of the embodiments, the angle may vary from point to point and the active edges of the magnet may, for reasons stated, be stepped. In such embodiments, the term "angled edge" shall be understood to refer to the average, or virtual, edge, for example, the angle of a line which connects the beginning and end points of the actual magnetic edge.

We claim:

1. In a controller for producing a variable electrical output signal in response to manual manipulation, the combination comprising a frame, a carrier, means for guiding the carrier on the frame for relative forward and reverse movement with respect to the frame, a pair of tubes made of magnetically saturable material, each tube having an elongated sheet-like permanent magnet arranged in parallel proximity, the magnet being rigidly mounted on the carrier and both of the tubes being rigidly secured to the frame, the magnet having a pair of active angled edges separated from one another, the angled edges extending generally in the length dimension of the magnet, the tubes being so oriented and so spaced from one another that they simultaneously, transversely intersect the respective angled edges thereby dividing each tube into a saturated portion and an unsaturated portion, the tubes each being engaged by at least one turn of wire threaded therethrough, a detector circuit having its input connected to the turns of wire and having means for producing an electrical output signal in accordance with the differential magnetic saturation of the tubes, the angled edges of the magnet being so acutely angled with respect to the direction of relative movement that upon such movement the tubes are each progressively engaged by successive portions of the respective angled edges and, depending upon the direction of movement, one of the tubes is progressively more saturated in its longitudinal dimension while the remaining tube is progressively less saturated in its longitudinal dimension thereby to produce a corresponding change in the output signal of the detector circuit, the acute angle being sufficiently shallow so that the active range of relative movement between the carrier and the frame substantially exceeds the length dimension of the tubes.

2. In a controller for producing a variable electrical output signal in response to manual manipulation, the combination comprising a frame, a carrier, means for guiding the carrier on the frame for relative forward and reverse movement with respect to the frame, a pair of tubes of equal length made of magnetically saturable material, each tube having an elongated sheet-like permanent magnet arranged in parallel proximity, the magnet being rigidly mounted on the carrier and both of the tubes being secured rigidly to the frame, the magnet having a pair of active angled edges separated from one another, the angled edges extending generally in the length dimension of the magnet, the tubes being so oriented and so spaced from one another that they simultaneously intersect the respective angled edges for magnetic saturation over approximately complementary fractions of their length, the tubes each being engaged by at least one turn of wire threaded therethrough, a detector circuit having its input connected to the turns of wire and having means for producing an electrical output signal in accordance with the differential magnetic saturation of the tubes, the angled edges each being so acutely angled with respect to the direction of relative movement that upon such movement the tubes are each progressively engaged by successive portions of the respective angled edges and, depending upon the direction of movement, one of the tubes is progressively more saturated in its longitudinal dimension while the remaining tube is progressively less saturated in its longitudinal dimension so that the degree of saturation of the tubes in the length dimension remains substantially complimentary over the active range of relative movement thereby to produce a corresponding change in the output signal of the detector circuit, the acute angle being sufficiently shallow so that the active range of relative movement substantially exceeds the length dimension of the tubes.

3. In a controller for producing a variable electrical output signal in response to manual manipulation, the combination comprising a frame, a carrier, means for guiding the carrier on the frame for relative forward and reverse movement with respect to the frame, a pair of tubes made of magnetically saturable material, each tube having an elongated sheet-like permanent magnet arranged in parallel proximity, the magnet being rigidly mounted on the carrier and both of the tubes being rigidly secured to the frame, the magnet having a pair of active angled edges separated from one another, the angled edges extending generally in the length dimension of the magnet, the tubes being oriented to transversely intersect the respective angled edges, the tubes each being engaged by at least one turn of wire threaded therethrough, a detector circuit having its input connected to the turns of wire and having means for producing an electrical output signal in accordance with the differential magnetic saturation of the tubes, the angled edges of the magnet being so acutely angled with respect to the direction of relative movement and the tubes being so spaced from one another that upon such movement at least one of the tubes is progressively engaged by successive portions of the respective angled edge of the magnet resulting in a progressive change in the saturation of said one tube in its longitudinal dimension thereby to produce a corresponding change in the output signal of the detector circuit, the acute angle being sufficiently shallow so that the active range of relative movement between the carrier and the frame substantially exceeds the length dimension of the tubes.

4. In a controller for producing a variable electrical output signal in response to manual manipulation, the combination comprising a frame, a carrier, means for guiding the carrier on the frame for relative forward and reverse movement with respect to the frame, a tube made of magnetically saturable material, the tube having an elongated sheet-like permanent magnet arranged in parallel proximity, the magnet being rigidly mounted on the carrier and the tube being rigidly secured to the frame, the magnet having an active angled edge, the angled edge extending generally in the length dimension of the magnet, the tube being so oriented as to transversely intersect the angled edge thereby dividing the tube into a saturated portion and an unsaturated portion, the tube being engaged by at least one turn of wire threaded therethrough, a detector circuit having its input connected to the turn of wire and having means for producing an electrical output signal in accordance with the degree of magnetic saturation of the tube, the angled edge of the magnet being so acutely angled with respect to the direction of relative movement that upon such movement the tube is progressively engaged by successive portions of the angled edge resulting in a progressive change in saturation in its longitudinal dimension thereby to produce a corresponding change in the output signal of the detector circuit, the acute angle being sufficiently shallow so that the active range of relative movement between the carrier and the frame substantially exceeds the length dimension of the tube.

5. The combination as claimed in claim 1 or in claim 2 or in claim 3 in which the tubes are angled at approximately equal angles with respect to the active edges of the magnet.

6. The combination as claimed in claim 1 or in claim 2 or in claim 3 or in claim 4 in which each tube is arranged generally transversely with respect to the direction of relative movement.

7. The combination as claimed in claim 1 or in claim 2 or in claim 3 in which substantially equal angles exist between the active edges of the magnet and the direction of relative movement of the carrier.

8. The combination as claimed in claim 1 or in claim 2 or in claim 3 in which the tubes are arranged parallel to one another with their axes perpendicular to the direction of relative movement.

9. The combination as claimed in claim 1 or in claim 2 or in claim 3 or in claim 4 in which the magnet has a constant thickness which is only a small fraction of its average length and width dimensions, the magnet being polarized in the thickness mode.

10. The combination as claimed in claim 1 or in claim 2 or in claim 3 or in claim 4 in which the magnet has a constant thickness which is only a small fraction of its average length and width dimensions and in which the magnet is formed of permanently magnetic particles in a soft plastic matrix polarized in the thickness mode.

11. The combination as claimed in claim 1 or in claim 2 or in claim 3 or in claim 4 in which the magnet has a constant thickness which is only a small fraction of its average length and width dimensions, the magnet being polarized in the thickness mode but with regions of alternating polarity adjacent to one another over the presented surface.

12. The combination as claimed in claim 1 or in claim 2 or in claim 3 or in claim 4 in which the magnet, although extensive and sheet-like, is of composite construction being formed of separate longitudinally extending strips of soft plastic material of substantially constant thickness arranged side-by-side loaded with permanently magnetic particles polarized in the thickness mode but with adjacent strips being of unlike polarity.

13. The combination as claimed in claim 1 or in claim 2 or in claim 3 or in claim 4 in which the magnet, although extensive and sheet-like, is of composite construction being formed of separate strips of soft plastic material of substantially constant thickness arranged side-by-side loaded with permanently magnetic particles polarized in the thickness mode but with adjacent strips being of unlike polarity, the strips being laterally spaced from one another.

14. The combination as claimed in claim 1 or in claim 2 or in claim 3 or in claim 4 in which the magnet, although extensive and sheet-like, is of composite construction being formed of separate strips of soft plastic material of substantially constant thickness arranged side-by-side loaded with permanently magnetic particles polarized in the thickness mode but with adjacent strips being of like polarity, the strips being laterally spaced from one another.

15. The combination as claimed in claim 1 or in claim 2 or in claim 3 or in claim 4 in which the magnet, although extensive and sheet-like, is of composite construction being formed of separate strips of permanently magnetic material of substantially constant thickness arranged side-by-side on the carrier, the strips being polarized in the thickness mode and laterally spaced from one another, the carrier being formed of non-magnetic material having a rib extending longitudinally along the surface thereof, the rib being received in the space between two adjacent strips to define the separation and alignment thereof.

16. The combination as claimed in claim 1 or in claim 2 or in claim 3 in which the active edges each occupy a helical locus and in which the tubes are arranged substantially parallel to the axis of the helical locus.

17. The combination as claimed in claim 1 or in claim 2 or in claim 3 in which the active edges and the tubes are arranged in respectively adjacent parallel planes and in which means are provided for relatively transporting the active edges in their plane about an arcuate path, the active edges being spirally oriented about the center of the arcuate path.

18. The combination as claimed in claim 1 or in claim 2 or in claim 3 in which the magnet is in two triangular portions separated from one another but symmetrically oriented with respect to the direction of relative movement.

19. The combination as claimed in claim 1 or in claim 2 or in claim 3 in which the magnet is of parallelogram profile with the long edges thereof being the active edges and in which the tubes are arranged substantially coaxially end-to-end.

20. The combination as claimed in claim 1 or in claim 2 in which each active edge has a step, the steps being so positioned as to be encountered simultaneously by the associated tube in the course of relative movement, the steps being equal and opposite to one another so that relative movement in one direction causes a stepped increase in the degree of saturation in one of the tubes and a corresponding stepped decrease in degree of saturation of the remaining tube resulting in corresponding abrupt change in the output signal of the detector circuit.

21. The combination as claimed in claim 1 or in claim 2 in which each active edge has a step at the center thereof, the steps being equal and opposite to one another so that relative movement of the tubes from center position in one direction causes a stepped increase in the degree of saturation of one of the tubes and a stepped decrease in the degree of saturation of the remaining tube resulting in corresponding abrupt change in the output signal of the detector circuit upon movement from the center position.

22. The combination as claimed in claim 1 or in claim 2 or in claim 3 or in claim 4 in which the magnet, although extensive and sheet-like, is of composite construction being formed of separate longitudinally extending strips of substantially constant thickness arranged side-by-side parallel to one another and polarized in the thickness mode, the strips being of unlike lengths to form a step in the active edge of the magnet.

23. The combination as claimed in claim 1 or in claim 2 or in claim 3 or in claim 4 in which the magnet, although extensive and sheet-like, is of composite construction being formed of separate longitudinally extending strips of substantially constant thickness polarized in the thickness mode, the strips over at least a portion of their length being of tapering width.

24. The combination as claimed in claim 1 or in claim 2 in which the carrier is relatively movable in opposite directions from a reference position and in which the degree of saturation of the tubes in the length dimension is substantially complimentary over the active range of relative movement but in which the active edges on the opposite sides of reference position differ from one another in profile so as to produce an electrical output characteristic which differs in the forward and reverse directions of relative movement.

25. The combination as claimed in claim 1 or in claim 2 including means defining a reference position for the magnet with respect to the tubes in which each tube is saturated over one-half of its longitudinal dimension resulting in a zero output signal of the detector circuit at the reference position.

26. The combination as claimed in claim 1 or in claim 2 or in claim 3 or in claim 4 in which there is provided, fixed to the tube on the opposite side of the tube from the magnet, a magnetic intensifier strip arranged parallel to the magnet and having dimensions generally conforming to the length and width dimensions of the tube, the intensifier strip being formed of magnetic material having a low degree of reluctance so that the only flux therein in that which is currently induced by the permanent magnet.

* * * * *